(12) United States Patent
Hsu et al.

(10) Patent No.: US 9,632,348 B2
(45) Date of Patent: Apr. 25, 2017

(54) DISPLAY PANEL AND DISPLAY DEVICE (71) Applicant: INNOLUX CORPORATION, Jhu-Nan, Miao-Li County (TW)

(72) Inventors: Yu-Lun Hsu, Jhu-Nan (TW); Yi-Chin Lee, Jhu-Nan (TW); Chao-Hsiang Wang, Jhu-Nan (TW); An-Chang Wang, Jhu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 6 days.

(21) Appl. No.: 14/338,186

(22) Filed: Jul. 22, 2014

(65) Prior Publication Data

US 2015/0277184 A1    Oct. 1, 2015

(30) Foreign Application Priority Data

Apr. 1, 2014    (TW) .............................. 103112171 A (51) Int. Cl.
*G02F 1/1333* (2006.01)
*G02F 1/1335* (2006.01)
*G02F 1/1343* (2006.01)

(52) U.S. Cl.
CPC .. *G02F 1/133512* (2013.01); *G02F 1/134309* (2013.01); *G02F 1/134363* (2013.01); *G02F 2001/134372* (2013.01)

(58) Field of Classification Search
CPC ......... G02F 1/133512; G02F 1/134309; G02F 1/134363; G02F 2001/134372
(Continued)

(56) References Cited

U.S. PATENT DOCUMENTS 5,870,157 A * 2/1999 Shimada ........... G02F 1/133514
349/106
2007/0273819 A1* 11/2007 Kawasaki ......... G02F 1/134363
349/141
(Continued)

FOREIGN PATENT DOCUMENTS

JP    2008-076978    4/2008
JP    2010-282037    12/2010
(Continued)

*Primary Examiner* — Charles Chang
(74) *Attorney, Agent, or Firm* — Liu & Liu (57) ABSTRACT

A pixel array is disposed on a first substrate and comprises a pixel having a first electrode layer including a plurality of electrode portions. A light-blocking layer is disposed on a second substrate along a first direction and includes a first and second light-blocking portions. The first electrode layer is between the first and second light-blocking portions. The first light-blocking portion has a first edge away from the first electrode layer, and the electrode portions include a first electrode portion adjacent to the first light-blocking portion. A brightness distribution of the pixel along the first direction has a first maximum brightness corresponding to a first position on the second substrate. PTB denotes the minimum width from the first position to the first edge, Px denotes the width of the pixel along the first direction, conforming to the following equation:

$$3.9 + 77.1e^{\frac{-Px}{2.7}} + 4.5e^{\frac{-Px}{34.3}} + 0.5e^{\frac{-Px}{0.1}} \leq$$
$$PTB \leq 8.9 + 77.1e^{\frac{-Px}{2.7}} + 4.5e^{\frac{-Px}{34.3}} + 0.5e^{\frac{-Px}{0.1}}.$$

10 Claims, 11 Drawing Sheets (58) Field of Classification Search
USPC .................................................. 349/110–111
See application file for complete search history.

(56) References Cited

U.S. PATENT DOCUMENTS

| | | | | |
|---|---|---|---|---|
| 2010/0001939 A1* | 1/2010 | Ochiai | .............. | G02F 1/133512 345/88 |
| 2010/0007824 A1* | 1/2010 | Satoh | ................ | G02F 1/133553 349/113 |
| 2010/0296017 A1* | 11/2010 | Yoshida | ............ | G02F 1/136286 349/38 |
| 2013/0271683 A1* | 10/2013 | Jang | .................. | G02F 1/134363 349/42 |

FOREIGN PATENT DOCUMENTS

| | | |
|---|---|---|
| JP | 2013-250331 | 12/2013 |
| KR | 2011-0028753 | 3/2011 |
| TW | I292506 | 1/2008 |

\* cited by examiner

DISPLAY PANEL AND DISPLAY DEVICE

CROSS REFERENCE TO RELATED APPLICATIONS

This Non-provisional application claims priority under 35 U.S.C. §119(a) on Patent Application No(s). 103112171 filed in Taiwan, Republic of China on Apr. 1, 2014, the entire contents of which are hereby incorporated by reference.

BACKGROUND OF THE INVENTION

Field of Invention

The invention relates to a display panel and a display device and, in particular, to a display panel and a display device which can reduce the color shift effect caused by the light leakage of pixel.

Related Art

With the progress of technologies, display devices have been widely applied to various kinds of fields. Especially, liquid crystal display (LCD) devices, having advantages such as compact structure, low power consumption and less radiation, gradually take the place of cathode ray tube (CRT) display devices, and are widely applied to various electronic products, such as mobile phones, portable multimedia devices, notebooks, LCD TVs and LCD screens.

A conventional LCD device mainly includes an LCD panel and a backlight module which are disposed opposite to each other. The LCD panel mainly includes a color filter (CF) substrate, a thin film transistor (TFT) substrate and a liquid crystal layer disposed between the two substrates. The CF substrate, the TFT substrate and the LC layer can form a plurality of pixel disposed in an array, and each of the pixels includes a plurality of LC molecules. The backlight module emits the light passing through the LCD panel, and the pixel of the LCD panel can display colors to form images accordingly.

Moreover, in a conventional LCD panel, the rotation of the LC molecules of the pixel is controlled to show the bright and dark gray-level variation by the electric field formed between the pixel electrode and the common electrode. However, when a pixel is at the bright state and another pixel is at the dark state, the LC molecules of the dark-state pixel will be influenced by the electric field distribution of the bright-state pixel, and therefore the LC molecules of the dark-state pixel closer to the edge of the bright-state pixel will rotate accordingly. Hence, the dark-state pixel will undergo the light leakage effect, leading to the problems of color shift and less contrast of the LCD panel.

Therefore, it is an important subject to provide a display panel and a display device which can reduce the color shift problem caused by the light leakage of pixel to enhance the display quality.

SUMMARY OF THE INVENTION

In view of the foregoing subject, an objective of the invention is to provide a display panel and a display device which can reduce the color shift problem caused by the light leakage of pixel to enhance the display quality.

To achieve the above objective, a display panel according to the invention includes a first substrate, a second substrate disposed opposite to the first substrate, a pixel array and a light-blocking layer. The pixel array is disposed on the first substrate and between the first and second substrates, the pixel array at least includes a pixel having a first electrode layer including a plurality of electrode portions, and the electrode portions are spaced from each other and disposed along a first direction. The light-blocking layer is disposed on the second substrate along the first direction in a spacing manner and includes a first light-blocking portion and a second light-blocking portion. The first electrode layer is between the first light-blocking portion and the second light-blocking portion correspondingly. The first light-blocking portion has a first edge away from the first electrode layer along the first direction, and the electrode portions include a first electrode portion adjacent to the first light-blocking portion. When a light passes through the pixel, the pixel has a brightness distribution along the first direction, the brightness distribution, correspondingly between the first electrode portion and the first light-blocking portion, has a first brightness maximum that is corresponding to a first location on the second substrate, the minimum width from the first location to the first edge along the first direction is denoted by PTB, the width of the pixel along the first direction is denoted by Px, and PTB and Px conform to the following equation:

$$3.9 + 77.1e^{\frac{-Px}{2.7}} + 4.5e^{\frac{-Px}{34.3}} + 0.5e^{\frac{-Px}{0.1}} \le$$
$$PTB \le 8.9 + 77.1e^{\frac{-Px}{2.7}} + 4.5e^{\frac{-Px}{34.3}} + 0.5e^{\frac{-Px}{0.1}},$$

and the units of PTB and Px are µm.

To achieve the above objective, a display device according to the invention includes a display panel, and the display panel includes a first substrate, a second substrate disposed opposite to the first substrate, a pixel array and a light-blocking layer. The pixel array is disposed on the first substrate and between the first and second substrates, the pixel array at least includes a pixel having a first electrode layer including a plurality of electrode portions, and the electrode portions are spaced from each other and disposed along a first direction. The light-blocking layer is disposed on the second substrate along the first direction in a spacing manner and includes a first light-blocking portion and a second light-blocking portion. The first electrode layer is between the first light-blocking portion and the second light-blocking portion correspondingly. The first light-blocking portion has a first edge away from the first electrode layer along the first direction, and the electrode portions include a first electrode portion adjacent to the first light-blocking portion. When a light passes through the pixel, the pixel has a brightness distribution along the first direction, the brightness distribution, correspondingly between the first electrode portion and the first light-blocking portion, has a first brightness maximum that is corresponding to a first location on the second substrate, the minimum width from the first location to the first edge along the first direction is denoted by PTB, the width of the pixel along the first direction is denoted by Px, and PTB and Px conform to the following equation:

$$3.9 + 77.1e^{\frac{-Px}{2.7}} + 4.5e^{\frac{-Px}{34.3}} + 0.5e^{\frac{-Px}{0.1}} \le$$
$$PTB \le 8.9 + 77.1e^{\frac{-Px}{2.7}} + 4.5e^{\frac{-Px}{34.3}} + 0.5e^{\frac{-Px}{0.1}},$$

and the units of PTB and Px are µm.

In one embodiment, PTB and Px further conform to the following equation:

$$3.9 + 77.1e^{\frac{-Px}{2.7}} + 4.5e^{\frac{-Px}{34.3}} + 0.5e^{\frac{-Px}{0.1}} \le$$
$$PTB \le 7.9 + 77.1e^{\frac{-Px}{2.7}} + 4.5e^{\frac{-Px}{34.3}} + 0.5e^{\frac{-Px}{0.1}}$$

In one embodiment, the electrode portions further include a second electrode portion adjacent to the second light-blocking portion, the brightness distribution, correspondingly between the second electrode portion and the second light-blocking portion, further has a second maximum brightness that is corresponding to a second location on the second substrate, the maximum width from the second location to the first location along the first direction is denoted by m, and the width of the first light-blocking portion along the first direction is denoted by B, and PTB is equal to (Px+B−m)/2, and the units of B and m are μm.

In one embodiment, the first electrode layer further includes a first connection portion, which is disposed on the opposite sides of the electrode portions and electrically connected to the electrode portions.

In one embodiment, the first electrode layer further includes a second connection portion, which is disposed around the electrode portions and electrically connected with the electrode portions.

As mentioned above, in the display panel and display device of the invention, the first electrode layer of the pixel of the display panel includes a plurality of electrode portions and is between the first light-blocking portion and the second light-blocking portion of the light-blocking layer correspondingly. The first light-blocking portion has a first edge away from the first electrode layer along the first direction, and the electrode portions include the first electrode portion adjacent to the first light-blocking portion. When the light passes through the pixel, the brightness distribution of the pixel along the first direction, correspondingly between the first electrode portion and the first light-blocking portion, has a first brightness maximum that is corresponding to the first location on the second substrate. The minimum width from the first location to the first edge along the first direction is denoted by PTB, and the width of the pixel along the first direction is denoted by Px, and PTB and Px conform to the following equation:

$$3.9 + 77.1e^{\frac{-Px}{2.7}} + 4.5e^{\frac{-Px}{34.3}} + 0.5e^{\frac{-Px}{0.1}} \le$$
$$PTB \le 8.9 + 77.1e^{\frac{-Px}{2.7}} + 4.5e^{\frac{-Px}{34.3}} + 0.5e^{\frac{-Px}{0.1}}$$

Thereby, when the minimum width PTB from the first location on the second substrate to the first edge of the first light-blocking portion along the first direction and the width Px of the pixel along the first direction conform to the above equation, the color shift caused by the light leakage of the pixel can be reduced. Therefore, the display panel and device of the invention can reduce color shift caused by the light leakage of the pixel and thus enhance the display quality.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
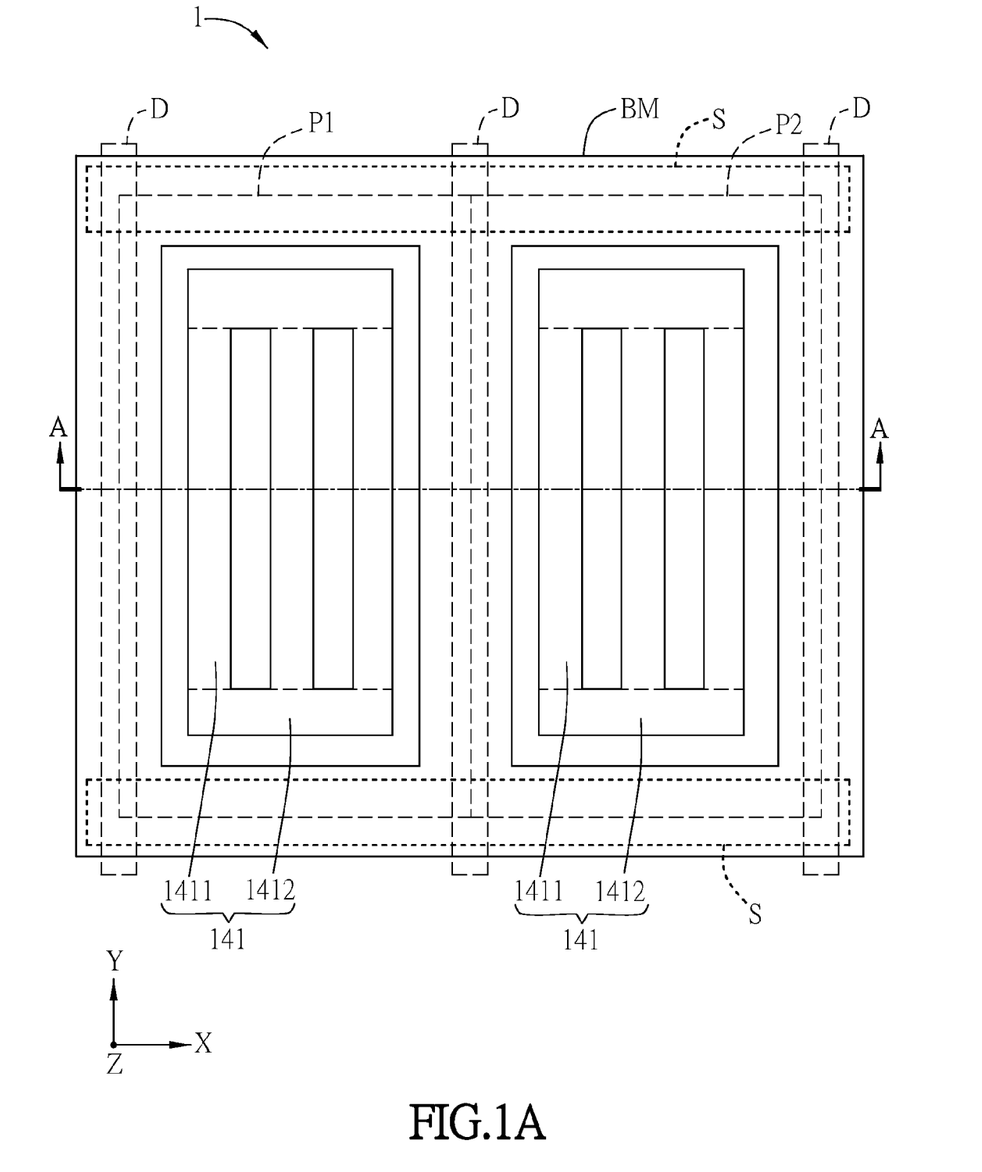
FIG. 1A is a schematic diagram of two adjacent pixels P1, P2 of a display panel according to an embodiment of the invention.
Figure 1B:
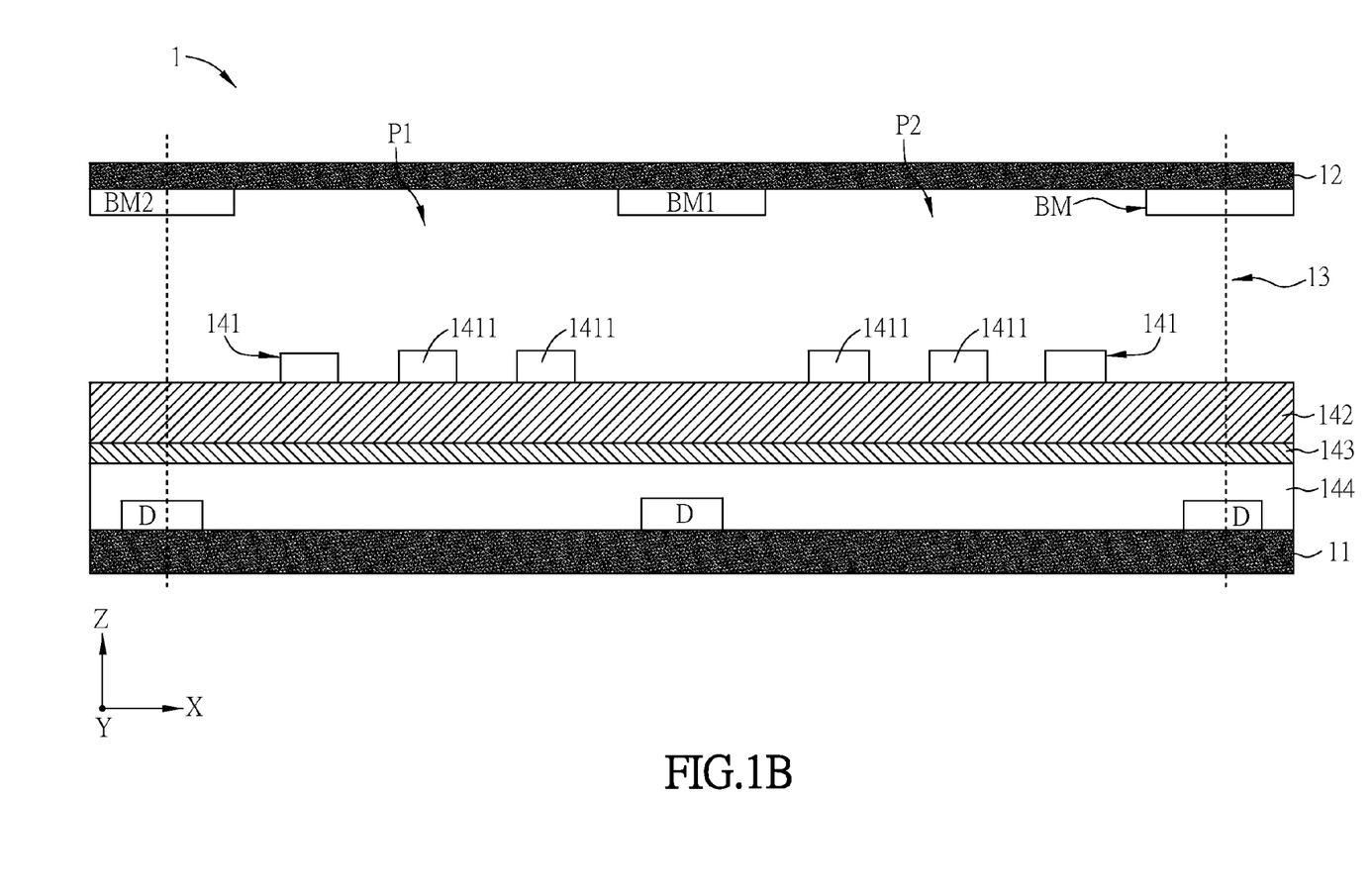
FIG. 1B is a schematic sectional diagram of the display panel taken along the line A-A in FIG. 1A.
Figure 1C:
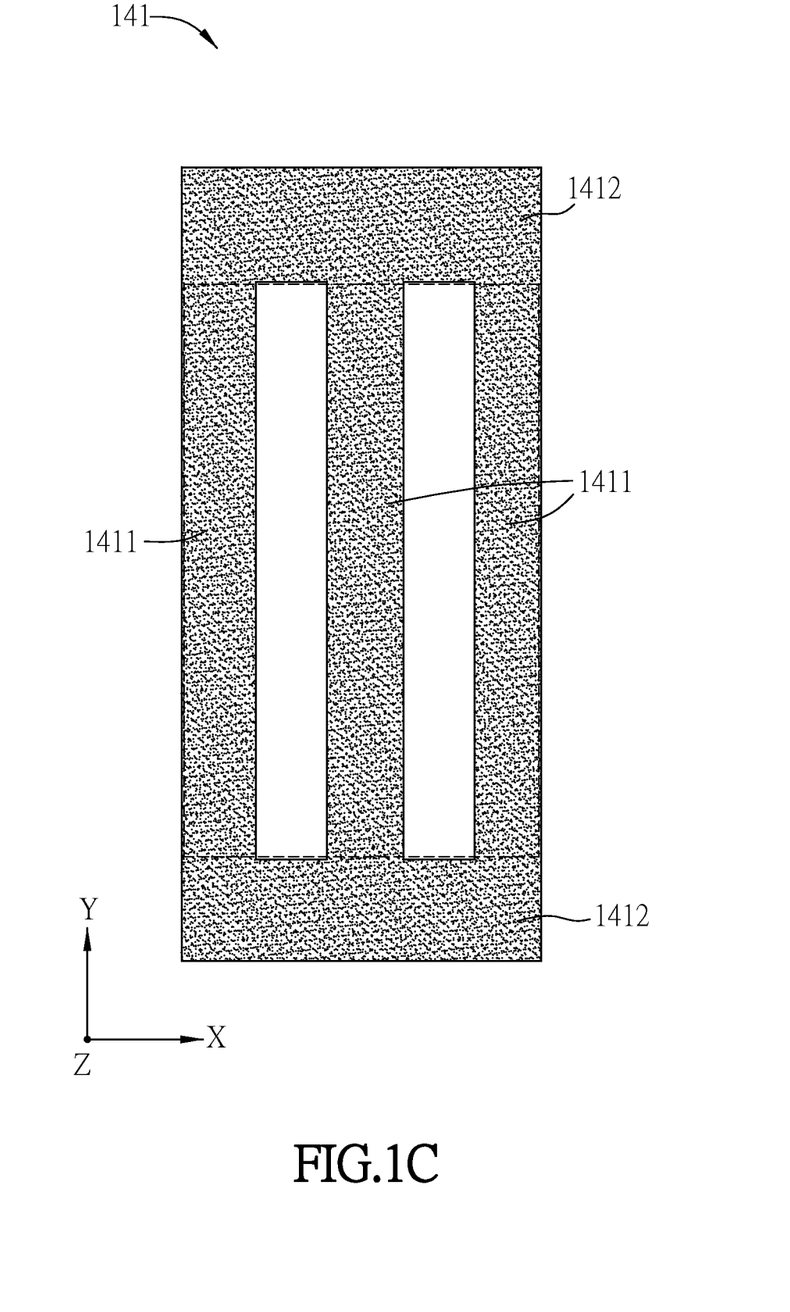
FIG. 1C is a schematic diagram of a first electrode layer of the display panel.

FIG. 1A is a schematic diagram of two adjacent pixels P1, P2 of a display panel 1 according to an embodiment of the invention, FIG. 1B is a schematic sectional diagram of the display panel 1 taken along the line A-A in FIG. 1A, and FIG. 1C is a schematic diagram of a first electrode layer 141 of the display panel 1.

The display panel 1 is, for example but not limited to, a fringe field switching (FFS) LCD panel or another LCD panel of horizontal driving type. For the easier understanding, FIG. 1A just shows two scan lines S, three data lines D, two pixels P1, P2, two first electrode layers 141 and a light-blocking layer BM of the display panel 1, and other elements of the display panel 1 are not shown. Moreover, a first direction X (horizontal direction), a second direction Y (vertical direction) and a third direction Z are shown in FIGS. 1A, 1B, 1C, and any two of them are perpendicular to each other. The first direction X is substantially parallel to the extending direction of the scan line S, the second direction Y is substantially parallel to the extending direction of the data line D, and the third direction Z is perpendicular to the first direction X and the second direction Y.

The display panel 1 includes a first substrate 11, a second substrate 12 and a liquid crystal layer 13. The first substrate 11 and the second substrate 12 are disposed oppositely, and the liquid crystal layer 13 is disposed between the first substrate 11 and the second substrate 12. Each of the first substrate 11 and the second substrate 12 is made by a transparent material, and can be a glass substrate, a quartz substrate or a plastic substrate for example.

The display panel 1 further includes a pixel array, which is disposed on the first substrate 11 and between the first substrate 11 and the second substrate 12. The pixel array includes at least a pixel. Here for example, the pixel array includes a plurality of pixels, which are disposed between the first and second substrates 11 and 12 and in an array along the first and second directions X and Y. Besides, the display panel 1 can further include a plurality of scan lines S and a plurality of data lines D, and the scan lines S and the data lines D cross each other and are perpendicular to each other to define each pixel area of the pixel array.

By taking the pixel P1 as an example, the pixel P1 includes a first electrode layer 141, a first insulation layer 142, a second electrode layer 143 and a second insulation layer 144. In this embodiment, the second insulation layer 144, the second electrode layer 143, the first insulation layer 142 and the first electrode layer 141 are sequentially disposed on the side of the first substrate 11 facing the second substrate 12 from bottom to top.

The data line D is disposed on the first substrate 11 and the second insulation layer 144 covers the data line D. The second electrode layer 143 is disposed on the second insulation layer 144, and the first insulation layer 142 is disposed between the first electrode layer 141 and the second electrode layer 143 to separate the first electrode layer 141 from the second electrode layer 143 to avoid their short circuit. The material of the first and second insulation layers 142 and 144 may include SiOx, SiNx or other material for example, but the invention is not limited thereto. Each of the first and second electrode layers 141 and 143 is a transparent conductive layer, and the material thereof may include indium tin oxide (ITO) for example. In this embodiment, the first electrode layer 141 is a pixel electrode and electrically connected to the data line D, and the second elector delayer 143 is a common electrode. In other embodiments, however, the first electrode layer 141 can be a common electrode while the second electrode layer 143 is a pixel electrode.

The first electrode layer 141 includes a plurality of electrode portions 1411 and a first connection portion 1412. Herein for example, the first electrode layer 141 includes three electrode portions 1411 and two first connection portions 1412. The two first connection portions 1412 are disposed on the opposite sides of the electrode portions 1411 and electrically connected to the electrode portions 1411. The electrode portions 1411 are spaced from each other and disposed along the first direction X. Herein, the electrode portions 1411 are spaced from each other and disposed parallelly along the first direction X.

As shown in FIG. 1B, the display panel 1 can further include a light-blocking layer BM and a filter layer (not shown). The light-blocking layer BM is a black matrix. The light-blocking layer BM is disposed on the second substrate 12 along the first direction X in a spacing manner and disposed opposite to the data lines D. Herein, the light-blocking layer BM includes a first light-blocking portion BM1 and a second light-blocking portion BM2. The light-blocking layer BM is made by opaque material, such as resin or metal (e.g. Cr, chromium oxide, or Cr—O—N compound) for example. In this embodiment, the light-blocking layer BM is disposed on the side of the second substrate 12 facing the first substrate 11 and over the data lines D along the third direction Z. Accordingly, the light-blocking layer BM covers the data lines D in a top view of the display panel 1.

The filter layer is disposed on the side of the second substrate 12 and light-blocking layer BM facing the first substrate 11, and at least a light-blocking portion exists between two adjacent filter portions. Since the light-blocking layer BM is opaque, an opaque area can be formed on the second substrate 12 so as to define a transparent area. Therefore, when the light passes through the pixels P1, P2, the pixels P1, P2 will have a light-emitting area (the area of the pixels P1, P2 permeable to light). Moreover, the display panel 1 can further include a protection layer (e.g. overcoating, not shown), which can cover the light-blocking layer BM and the filter layer. The protection layer can include photoresist material, resin material or inorganic material (e.g. SiOx/SiOx), protecting the light-blocking layer BM and the filter layer from being damaged during the subsequent processes.

When the scan lines S of the display panel 1 receive a scan signal sequentially, the TFT (not shown) corresponding to each of the scan lines S can be enabled. Then, the data signals can be transmitted to the corresponding pixel electrodes through the data lines D and the display panel 1 can display images accordingly. In this embodiment, the gray-level voltage can be transmitted to the first electrode layer 141 (pixel electrode) of each of the pixels through each of the data lines D, and an electric filed can be thus formed between the first electrode layer 141 and the second electrode layer 143 (common electrode) to drive the LC molecules of the LC layer 13 to rotate on the plane that is in the first and second directions X and Y. Therefore, the light can be modulated and the display panel 1 can display images accordingly.

However, when the electric field is formed between the first electrode layer 141 and the second electrode layer 143 to drive the LC molecules to rotate, in the two adjacent pixels P1, P2 (the pixel P1 is at the bright state while the pixel P2 is at the dark state for example), the LC molecules of the dark-state pixel P2 will be influenced by the electric field distribution of the bright-state pixel P1, so that the LC molecules of the dark-state pixel P2 closer to the edge of the bright-state pixel P1 will rotate accordingly, and therefore the dark-state pixel P2 will undergo the light leakage effect, leading to the problems of color shift and less contrast of the LCD panel. Hence, the light-blocking range of the light-blocking layer BM needs to be defined to solve the said problems.

Figure 2A:
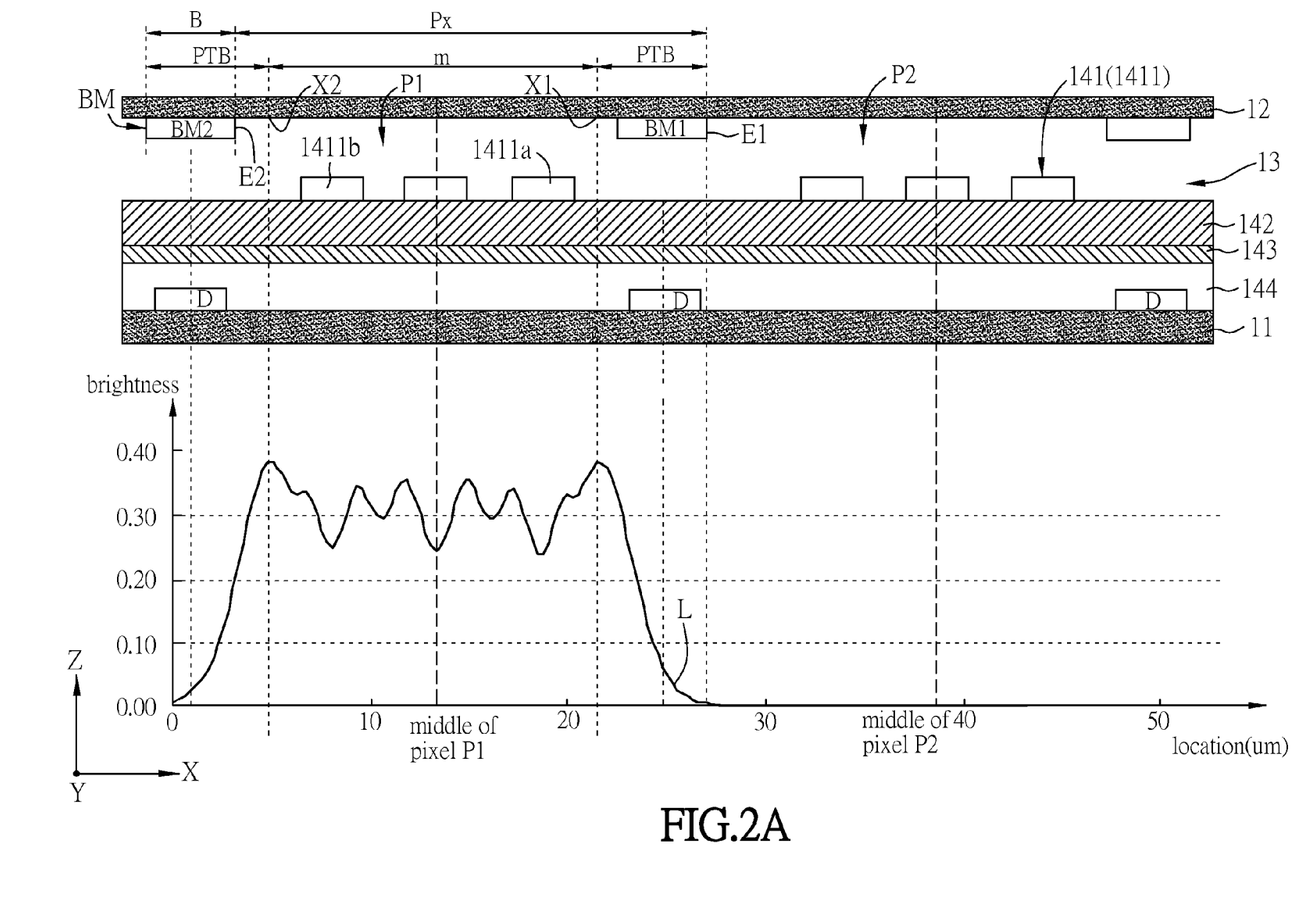
FIG. 2A is a schematic diagram showing the structure of the pixels P1, P2 of the display panel in FIG. 1B and the corresponding brightness distribution curve along the first direction when the pixel P1 is at the bright state and the pixel P2 is at the dark state.
Figure 2B:
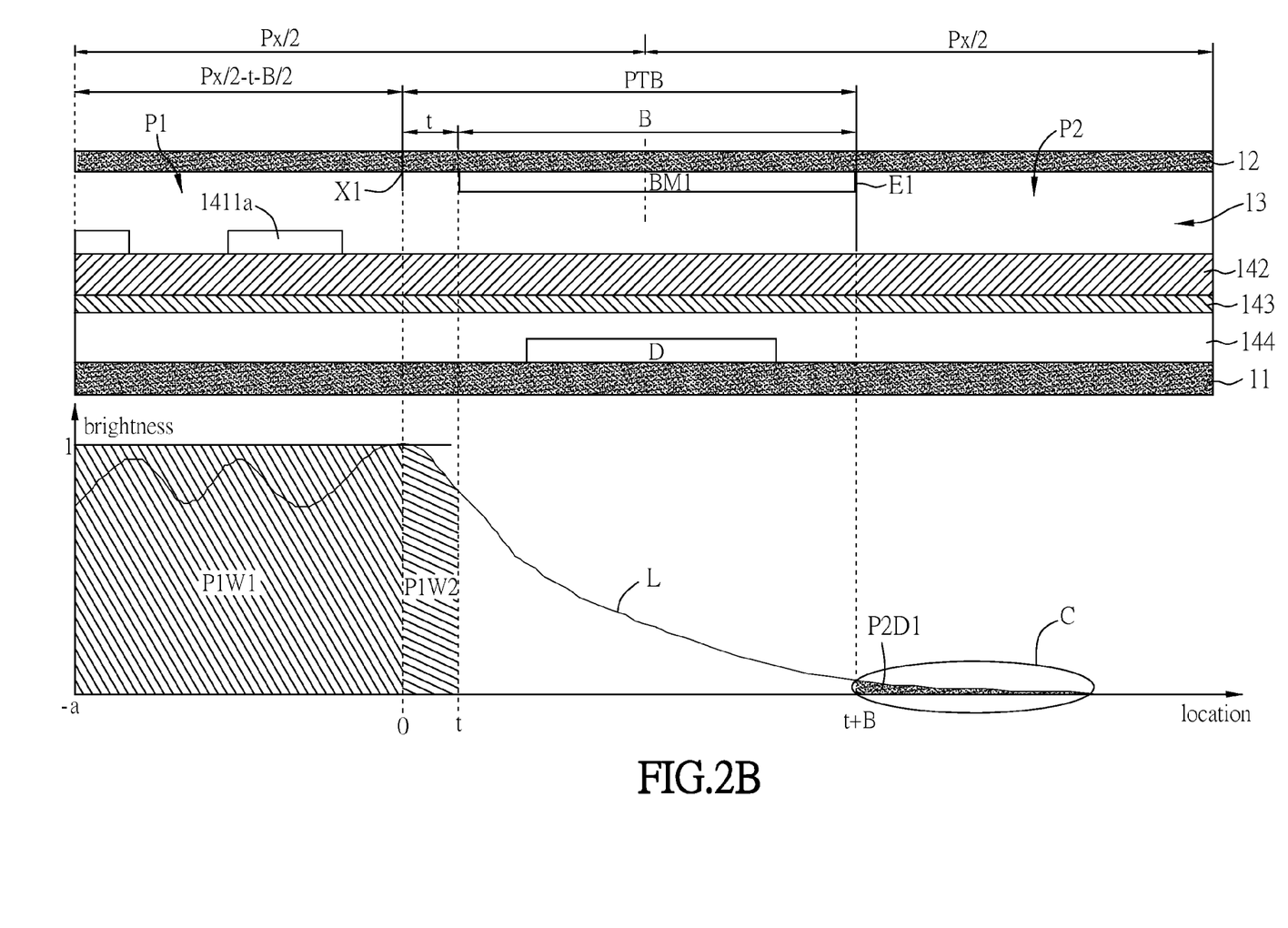
FIG. 2B is a schematic diagram showing the middle portion of each of the pixels P1 and P2 in FIG. 2A and the corresponding brightness distribution curve.

FIG. 2A is a schematic diagram showing the structure of the pixels P1, P2 of the display panel 1 in FIG. 1B and the corresponding brightness distribution curve L along the first direction X when the pixel P1 is at the bright state and the pixel P2 is at the dark state, and FIG. 2B is a schematic diagram showing the middle portion of each of the pixels P1 and P2 in FIG. 2A and the corresponding brightness distribution curve L. Herein, FIG. 2B shows the half structure of each of the pixels P1 and P2 and the corresponding brightness distribution curve L. Moreover, the brightness shown by the ordinate in FIG. 2B has been normalized (i.e. the maximum brightness is represented by the "unit 1"). Besides, the pixel P1 being at the bright state indicates the pixel P1 has the brightness of the brightest state, and that is to say the pixel P1 is on the state of 100% gray-level brightness (i.e. the fully bright state).

As shown in FIG. 2A, the first electrode layer 141 is between the first light-blocking portion BM1 and the second light-blocking portion BM2 correspondingly. The electrode portions 1411 include a first electrode portion 1411a adjacent to the first light-blocking portion BM1 and a second electrode portion 1411b adjacent to the second light-blocking portion BM2. The first light-blocking portion BM1 has a first edge E1, along the first direction X, away from the first electrode layer 141 (the first electrode portion 1411a), and the second light-blocking portion BM2 has a second edge E2, along the first direction X, adjacent to the first electrode layer 141 (the second electrode portion 1411b). A pixel width Px is a width of the pixel P1 along the first direction X. In other words, the width Px is the width from the first edge E1 to the second edge E2, and can have a range as follows: 5 μm≤Px≤500 μm, for example. Otherwise, the width Px also can be the width between the middle of the first light-blocking portion BM1 and the middle of the second light-blocking portion BM2 along the first direction X.

When the light passes through the pixel P1 to make the pixel P1 the bright state and doesn't pass through the pixel P2 to make the pixel P2 the dark state, the pixel P1 has a brightness distribution (i.e. the brightness distribution curve L) along the first direction X as shown in FIG. 2A. Herein, the brightness distribution formed by the light passing through the pixel P1 means the brightness distribution of the approximately middle portion of the pixel P1 when the light passes through along the third direction Z. The brightness distribution curve L has a first maximum brightness between the first electrode portion 1411a and the first light-blocking portion BM1, and the first maximum brightness is corresponding to a first location X1 on the second substrate 12. Besides, the brightness distribution curve L has a second maximum brightness between the second electrode portion 1411b and the second light-blocking portion BM2, and the second maximum brightness is corresponding to a second location X2 on the second substrate 12. In this embodiment, the first location X1 is located on the right side of the pixel P1 of FIG. 2A and the second location X2 is located on the left side of the pixel P1 of FIG. 2A. However, in other embodiments, the first location X1 corresponding to the first maximum brightness and the second location X2 corresponding to the second maximum brightness can interchange with each other. To be noted, the first location X1 being between the first electrode portion 1411a and the first light-blocking portion BM1 correspondingly indicates that the first location X1 on the second substrate 12 can be within the left edge of the first electrode portion 1411a and the right edge (i.e. the first edge E1) of the first light-blocking portion BM1, and that is the first location X1 can be within the range of the first electrode portion 1411a or the range of the first light-blocking portion BM1 along the first direction X. The second location X2 being between the second electrode portion 1411b and the second light-blocking portion BM2 correspondingly indicates that the second location X2 on the second substrate 12 can be within the right edge of the second electrode portion 1411b and the left edge of the second light-blocking portion BM2, and that is the second location X2 can be within the range of the second electrode portion 1411b or the range of the second light-blocking portion BM2 along the first direction X.

The maximum width from the second location X2 to the first location X1 along the first direction X is denoted by "m", and the width of the first light-blocking portion BM1 (or the second light-blocking portion BM2) along the first direction X is denoted by "B". So, the minimum width PTB from the first location X1 to the first edge E1 along the first direction X is equal to (Px+B−m)/2, and the units of PTB, Px, B and m are all "μm".

As shown in FIG. 2B, when the pixel P1 is at the bright state and the pixel P2 is at the dark state, a part of the light will occur in the region of the pixel P2 (the region C in FIG. 2B). So, as long as the area of the brightness distribution curve L corresponding to the pixel P1 (P1W1+P2W2, the integral of the brightness distribution curve L represents the energy) is far greater than the area corresponding to the pixel P2 (i.e. the area of the region C, P2D1), the light leakage effect of the pixel P2 can be lowered down to the least and the color shift caused by the light leakage of the pixel P2 can be thus reduced. Specifically, it can be achieved if the ratio of the twice P1W1 plus twice P1W2 to the twice P2D1 is great sufficiently. Herein, the level of the color shift is quantified by a defined parameter CR: CR=2(P1W1+P1W2)/2P2D1=(P1W1+P1W2)/P2D1.

The area of the P1W1 in FIG. 2B is about a rectangle and denoted by "A" approximately equal to 1*(Px/2−t−B/2). The brightness distribution curve L from the location "zero" (i.e. the first location X1) rightward to the infinity is equivalent to an exponential function: $e^{-kx}$ (k is, for example but not limited to, 0.8). So, $$P1W2 = \int_0^t e^{-kx}, \quad P2D1 = \int_{t+B}^{+\infty} e^{-kx},$$

$$\text{and } CR = \frac{P1W1 + P1W2}{P2D1} = \frac{A + \int_0^t e^{-kx} dx}{\int_{t+B}^{\infty} e^{-kx} dx}$$

By substituting A=Px/2−t−B/2 and k=0.8 into the above equations, the result can be derived from the calculation as follows:

$$CR = 0.8 e^{0.8(t+B)} \times \left( \frac{Px - (t+B) - t}{2} - \frac{e^{-0.8t} - 1}{0.8} \right)$$

Generally, if the CR value is greater than or equal to 1000 (CR≥1000), the color shift caused by the light leakage is acceptable for the human eyes. Accordingly, the values of PTB (PTB=t+B, PTB is the minimum width from the first location X1 to the first edge E1 along the first direction X) and Px will conform to the following equation (showing the lower limit of PTB):

$$PTB \geq 3.9 + 77.1 e^{\frac{-Px}{2.7}} + 4.5 e^{\frac{-Px}{34.3}} + 0.5 e^{\frac{-Px}{0.1}}$$

As shown in FIG. 2A, in the pixel P1, Px+B=PTB (left one)+m+PTB (right one). Theoretically the value of the left PTB is equal to the value of the right PTB, but they will be slightly different from each other due to the process factor in the practical process, so that the light leakage region uncovered by the light-blocking portion becomes larger, and therefore the CR value is decreased and thus influences the color shift. Hence, in consideration with the situation of the process factor (less than or equal to 5 μm in general), the upper limit of PTB is given to make the color shift acceptable, so that PTB and Px conform to the following equation:

$$3.9 + 77.1 e^{\frac{-Px}{2.7}} + 4.5 e^{\frac{-Px}{34.3}} + 0.5 e^{\frac{-Px}{0.1}} \leq$$
$$PTB \leq 8.9 + 77.1 e^{\frac{-Px}{2.7}} + 4.5 e^{\frac{-Px}{34.3}} + 0.5 e^{\frac{-Px}{0.1}}$$

When PTB and Px conform to the above equation, the color shift caused by the light leakage of the pixel P2 can be reduced. Favorably, in order to give the display panel 1 a better display quality, PTB and Px can conform to the following equation:

$$3.9 + 77.1 e^{\frac{-Px}{2.7}} + 4.5 e^{\frac{-Px}{34.3}} + 0.5 e^{\frac{-Px}{0.1}} \leq$$

-continued $$PTB \leq 7.9 + 77.1e^{\frac{-Px}{2.7}} + 4.5e^{\frac{-Px}{34.3}} + 0.5e^{\frac{-Px}{0.1}}$$

Figure 3A:
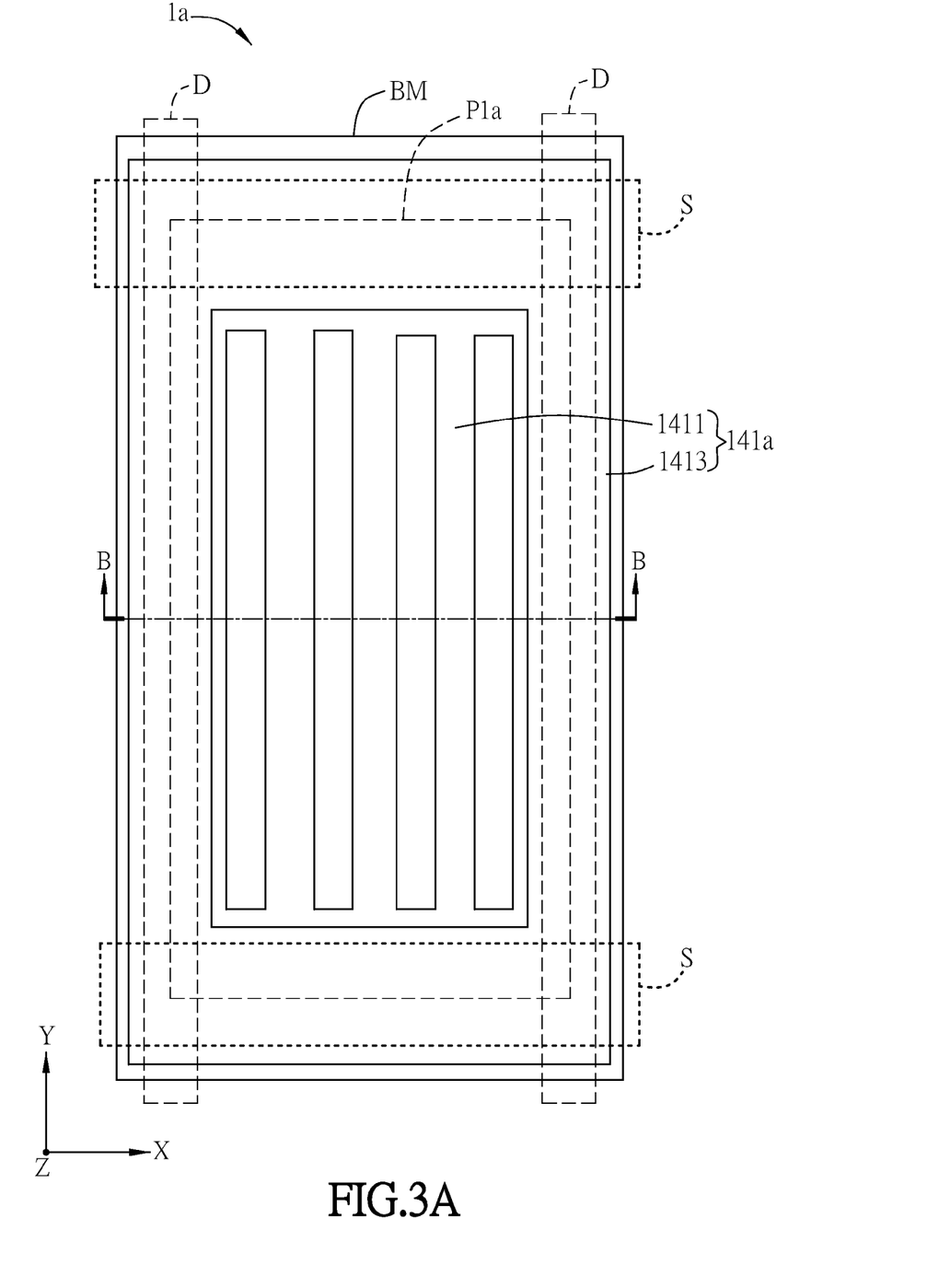
FIG. 3A is a schematic diagram of a display panel according to another embodiment of the invention.
Figure 3B:
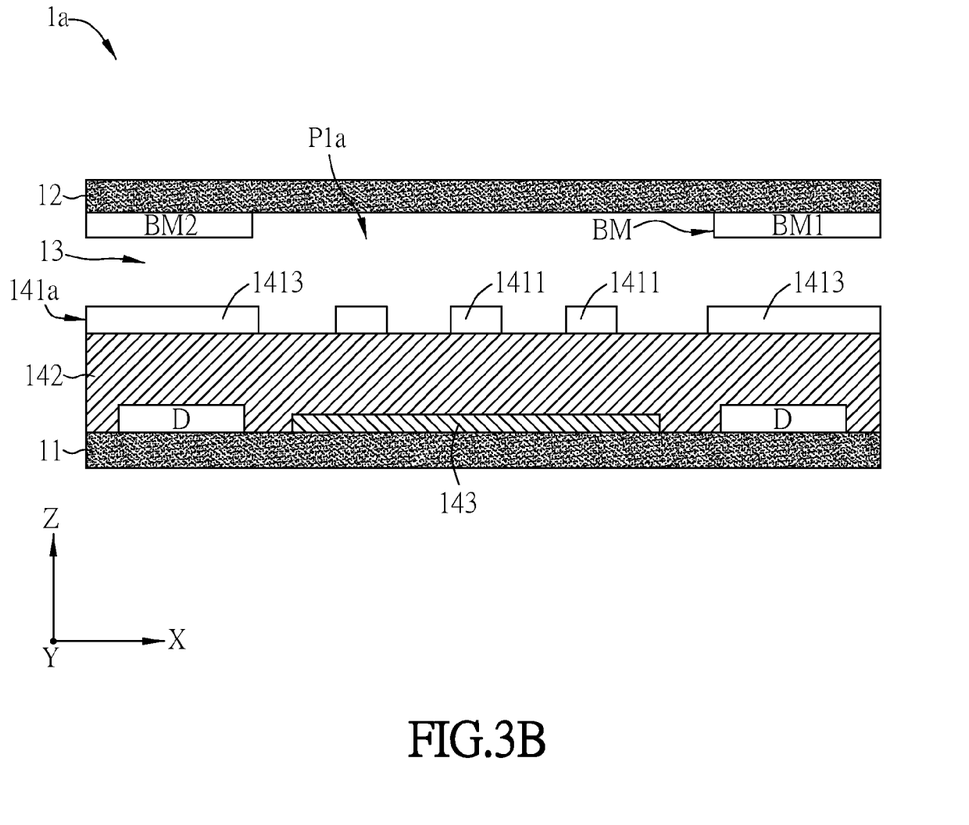
FIG. 3B is a schematic sectional diagram of the display panel taken along the line B-B in FIG. 3A.
Figure 3C:
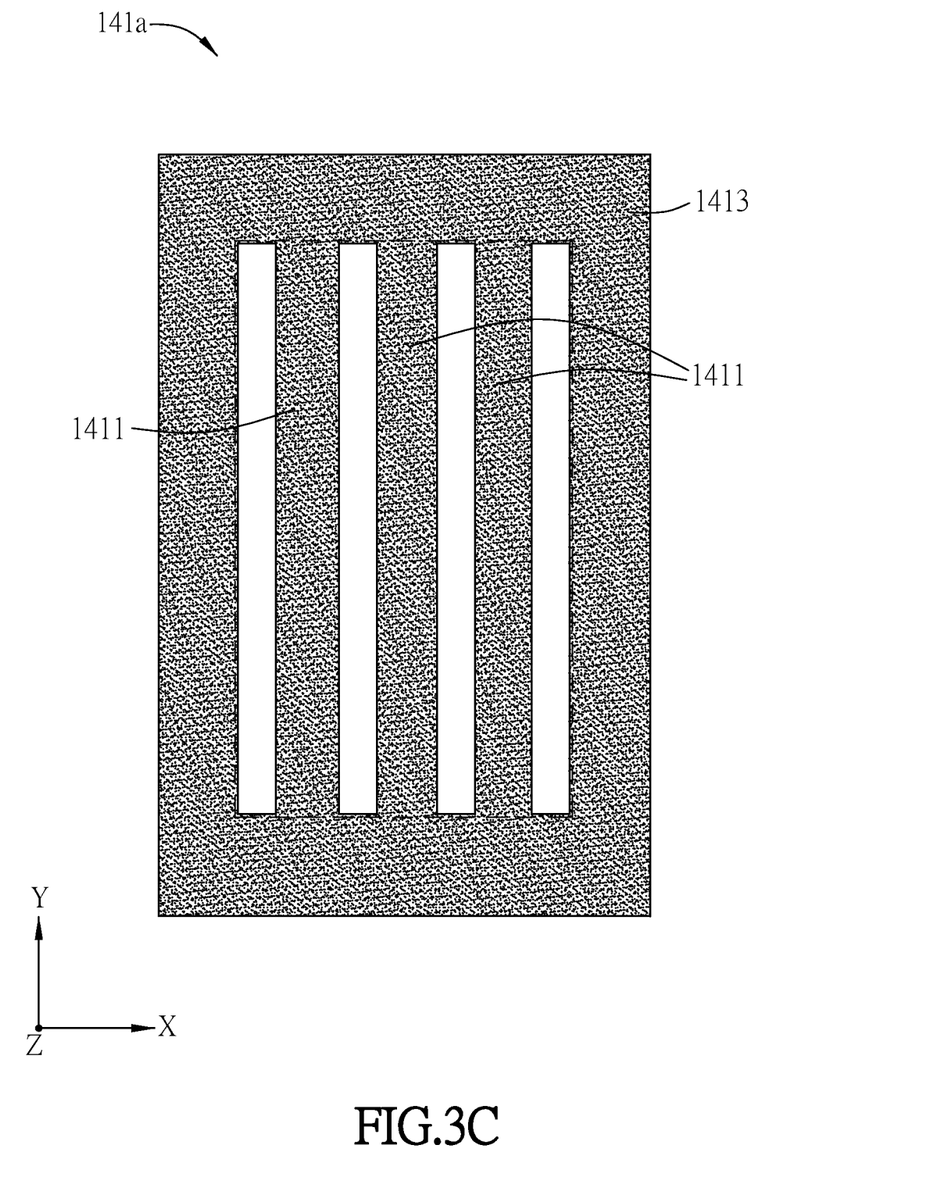
FIG. 3C is a schematic diagram of the first electrode layer in FIG. 3B.

FIG. 3A is a schematic diagram of a display panel 1a according to another embodiment of the invention, FIG. 3B is a schematic sectional diagram of the display panel 1a taken along the line B-B in FIG. 3A, and FIG. 3C is a schematic diagram of the first electrode layer 141a in FIG. 3B. Herein, FIGS. 3A and 3B just show a single pixel P1a.

As shown in FIGS. 3A to 3C, the main difference between the display panels 1a and 1 is that the first electrode layer 141a of the display panel 1a is a common electrode while the second electrode layer 143 is a pixel electrode. As shown in FIGS. 3B and 3C, the first electrode layer 141a includes three electrode portions 1411 and a second connection portion 1413, and the second connection portion 1413 is disposed around the electrode portions 1411 and electrically connected with the electrode portions 1411. The first insulation layer 142 covers the second electrode layer 143 and the data line D, and the first electrode layer 141a is disposed on the first insulation layer 142. Herein, the first insulation layer 142 is disposed between the first electrode layer 141a and the second electrode layer 143 to separate the first electrode layer 141a from the second electrode layer 143 (and the data line D) to avoid the short circuit.

Figure 4A:
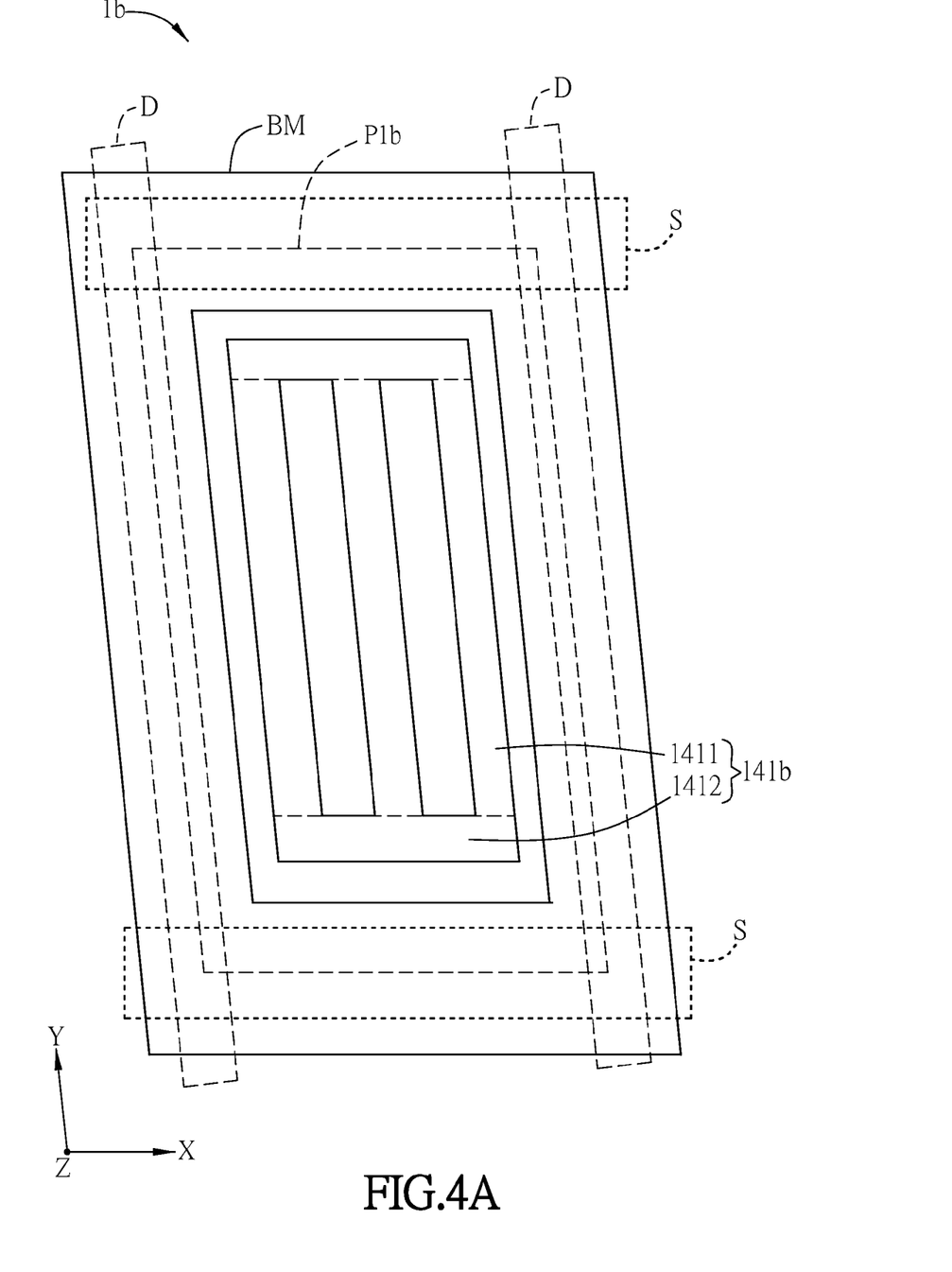
FIGS. 4A and 4B are schematic diagrams showing pixels of the display panels according to other embodiments of the invention, respectively.
Figure 4B:
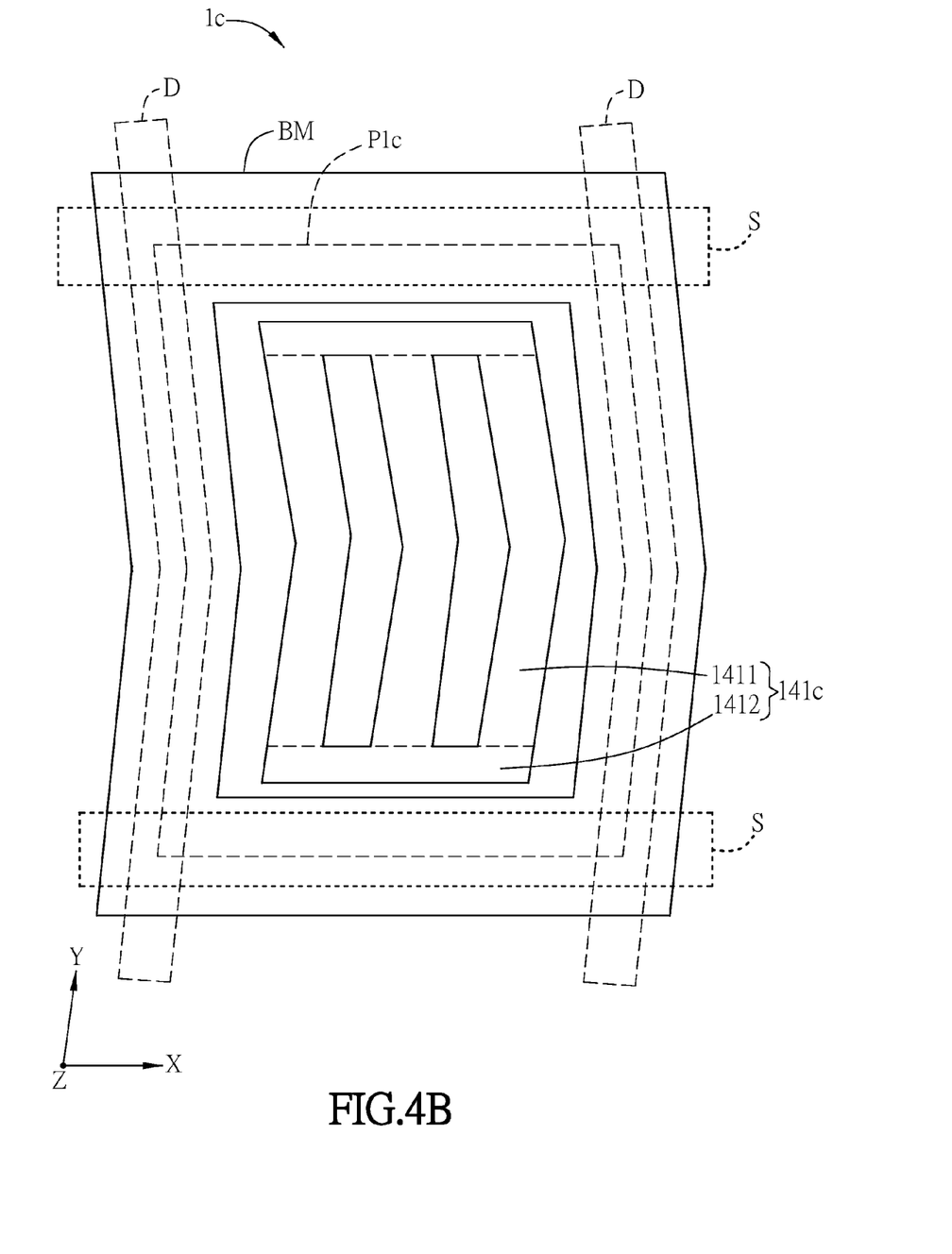

FIGS. 4A and 4B are schematic diagrams showing pixels P1b, P1c of the display panels 1b, 1c according to other embodiments of the invention, respectively.

As shown in FIG. 4A, the main difference between the display panels 1b and 1 is that in the display panel 1b the second direction Y is still substantially parallel to the extending direction of the data line D but the first direction X and the second direction Y have an obtuse angle instead of being perpendicular to each other, so that the pixel P1b is about a parallelogram. In other words, the scan lines S and the data lines D of the display panel 1b of this embodiment still cross each other but have an obtuse angle instead of being perpendicular to each other, so that the pixel P1b and the first electrode layer 141b are substantially parallelograms.

As shown in FIG. 4B, the main difference between the display panels 1c and 1 is that the data line D has a bending portion in the pixel P1c of the display panel 1c, so that the pixel P1c is not a parallelogram but has a bending portion corresponding to the bending portion of the data line D. Moreover, the electrode portion 1411 of the first electrode layer 141c also has a bending portion corresponding to the pixel P1c.

Other technical features of the display panels 1a, 1b, 1c can be comprehended by referring to the display panel 1 and are omitted here therefore.

Figure 5:
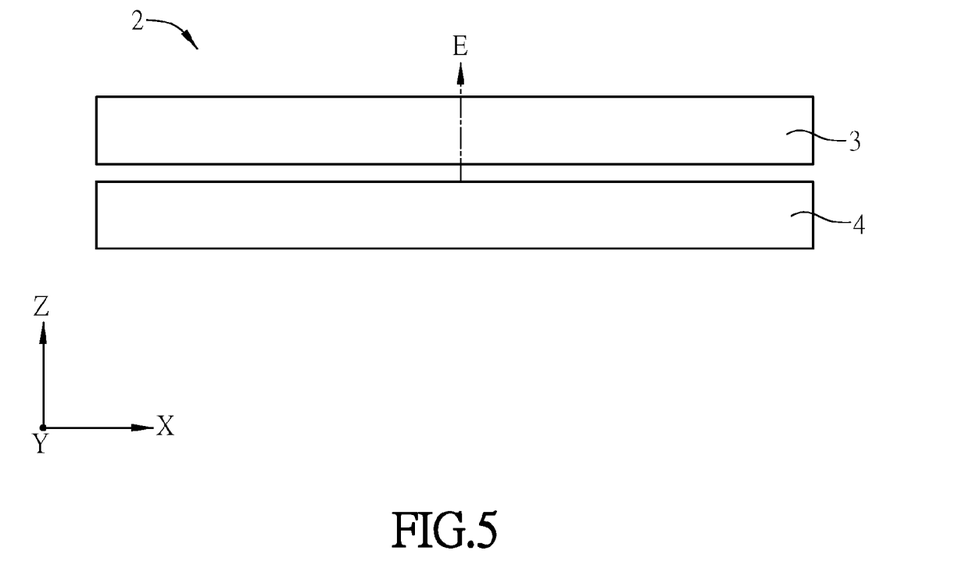
FIG. 5 is a schematic diagram of a display device according to an embodiment of the invention.

FIG. 5 is a schematic diagram of a display device 2 according to an embodiment of the invention.

As shown in FIG. 5, the display device 2 includes a display panel 3 and a backlight module 4 disposed opposite to the display panel 3. The display panel 3 can be any of the above-mentioned display panels 1, 1a, 1b, 1c so the description thereof is omitted here. When the backlight module 4 emits the light passing through the display panel 3, the pixels of the display panel 3 can display colors to form images accordingly.

Summarily, in the display panel and display device of the invention, the first electrode layer of the pixel of the display panel includes a plurality of electrode portions and is between the first light-blocking portion and the second light-blocking portion of the light-blocking layer correspondingly. The first light-blocking portion has a first edge away from the first electrode layer along the first direction, and the electrode portions include the first electrode portion adjacent to the first light-blocking portion. When the light passes through the pixel, the brightness distribution of the pixel along the first direction, correspondingly between the first electrode portion and the first light-blocking portion, has a first brightness maximum that is corresponding to the first location on the second substrate. The minimum width from the first location to the first edge along the first direction is denoted by PTB, and the width of the pixel along the first direction is denoted by Px, and PTB and Px conform to the following equation:

$$3.9 + 77.1e^{\frac{-Px}{2.7}} + 4.5e^{\frac{-Px}{34.3}} + 0.5e^{\frac{-Px}{0.1}} \leq$$
$$PTB \leq 8.9 + 77.1e^{\frac{-Px}{2.7}} + 4.5e^{\frac{-Px}{34.3}} + 0.5e^{\frac{-Px}{0.1}}$$

Thereby, when the minimum width PTB from the first location on the second substrate to the first edge of the first light-blocking portion along the first direction and the width Px of the pixel along the first direction conform to the above equation, the color shift caused by the light leakage of the pixel can be reduced. Therefore, the display panel and device of the invention can reduce color shift caused by the light leakage of the pixel and thus enhance the display quality.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of producing a display panel, comprising:
providing a first substrate;
disposing a second substrate opposite to the first substrate;
disposing a pixel array between the first substrate and the second substrate, wherein the pixel array includes a pixel having a first electrode layer, the first electrode layer includes a plurality of electrode portions, the plurality of electrode portions are spaced from each other and disposed along a first direction; and
disposing a light-blocking layer on the second substrate along the first direction in a spacing manner, wherein the light-blocking layer includes a first light-blocking portion and a second light-blocking portion, the first electrode layer is disposed between the first light-blocking portion and the second light-blocking portion from a second direction perpendicular to the first substrate, the first light-blocking portion has a first edge away from the first electrode layer along the first direction, and a first electrode portion of the plurality of electrode portions is adjacent to the first light-blocking portion,
wherein when a light passes through the pixel, the pixel has a brightness distribution along the first direction, the brightness distribution correspondingly between the first electrode portion and the first light-blocking portion has a first maximum brightness corresponding to a first location on the second substrate, a minimum width from the first location to the first edge along the first direction is denoted by PTB, a width of the pixel along the first direction is denoted by Px, and wherein PTB and Px conform to one of the following conditions:

$$3.9 + 77.1e^{\frac{-Px}{2.7}} + 4.5e^{\frac{-Px}{34.3}} + 0.5e^{\frac{-Px}{0.1}} <$$
$$PTB < 8.9 + 77.1e^{\frac{-Px}{2.7}} + 4.5e^{\frac{-Px}{34.3}} + 0.5e^{\frac{-Px}{0.1}},$$
$$PTB = 3.9 + 77.1e^{\frac{-Px}{2.7}} + 4.5e^{\frac{-Px}{34.3}} + 0.5e^{\frac{-Px}{0.1}}, \text{ or}$$
$$PTB = 8.9 + 77.1e^{\frac{-Px}{2.7}} + 4.5e^{\frac{-Px}{34.3}} + 0.5e^{\frac{-Px}{0.1}},$$

and the units of PTB and Px are μm.

2. The method as recited in claim 1, wherein PTB and Px further conform to one of the following conditions:

$$3.9 + 77.1e^{\frac{-Px}{2.7}} + 4.5e^{\frac{-Px}{34.3}} + 0.5e^{\frac{-Px}{0.1}} <$$
$$PTB < 7.9 + 77.1e^{\frac{-Px}{2.7}} + 4.5e^{\frac{-Px}{34.3}} + 0.5e^{\frac{-Px}{0.1}},$$
$$PTB = 3.9 + 77.1e^{\frac{-Px}{2.7}} + 4.5e^{\frac{-Px}{34.3}} + 0.5e^{\frac{-Px}{0.1}}, \text{ or}$$
$$PTB = 7.9 + 77.1e^{\frac{-Px}{2.7}} + 4.5e^{\frac{-Px}{34.3}} + 0.5e^{\frac{-Px}{0.1}}.$$

3. The method as recited in claim 1, wherein a second electrode portion of the plurality of electrode portions is adjacent to the second light-blocking portion, the brightness distribution correspondingly between the second electrode portion and the second light-blocking portion further has a second maximum brightness corresponding to a second location on the second substrate, a maximum width from the second location to the first location along the first direction is denoted by m, and a width of the first light-blocking portion along the first direction is denoted by B, and PTB is equal to (Px+B−m)/2, and the units of B and m are μm.

4. The method as recited in claim 1, wherein the first electrode layer further includes a first connection portion, the first connection portion is disposed on two opposite sides of the electrode portions and electrically connected to the electrode portions.

5. The method as recited in claim 1, wherein the first electrode layer further includes a second connection portion, the second connection portion is disposed around the electrode portions and electrically connected with the electrode portions.

6. A method of producing a display device, comprising:
forming a display panel including:
providing a first substrate;
disposing a second substrate opposite to the first substrate,
forming a pixel array and a light-blocking layer, wherein the pixel array is disposed between the first substrate and the second substrate, the pixel array includes a pixel having a first electrode layer, the first electrode layer includes a plurality of electrode portions, the plurality of electrode portions are spaced from each other and disposed along a first direction, the light-blocking layer is disposed on the second substrate along the first direction in a spacing manner, the light-blocking layer includes a first light-blocking portion and a second light-blocking portion, the first electrode layer is disposed between the first light-blocking portion and the second light-blocking portion in a second direction perpendicular to the first substrate, the first light-blocking portion has a first edge away from the first electrode layer along the first direction, and a first electrode portion of the plurality of electrode portions is adjacent to the first light-blocking portion,
wherein when a light passes through the pixel, the pixel has a brightness distribution along the first direction, wherein the brightness distribution correspondingly between the first electrode portion and the first light-blocking portion has a first maximum brightness corresponding to a first location on the second substrate, a minimum width from the first location to the first edge along the first direction is denoted by PTB, a width of the pixel along the first direction is denoted by Px, and
wherein PTB and Px conform to one of the following conditions:

$$3.9 + 77.1e^{\frac{-Px}{2.7}} + 4.5e^{\frac{-Px}{34.3}} + 0.5e^{\frac{-Px}{0.1}} <$$
$$PTB < 8.9 + 77.1e^{\frac{-Px}{2.7}} + 4.5e^{\frac{-Px}{34.3}} + 0.5e^{\frac{-Px}{0.1}},$$
$$PTB = 3.9 + 77.1e^{\frac{-Px}{2.7}} + 4.5e^{\frac{-Px}{34.3}} + 0.5e^{\frac{-Px}{0.1}}, \text{ or}$$
$$PTB = 8.9 + 77.1e^{\frac{-Px}{2.7}} + 4.5e^{\frac{-Px}{34.3}} + 0.5e^{\frac{-Px}{0.1}},$$

and the units of PTB and Px are μm.

7. The method as recited in claim 6, wherein PTB and Px further conform to one of the following conditions:

$$3.9 + 77.1e^{\frac{-Px}{2.7}} + 4.5e^{\frac{-Px}{34.3}} + 0.5e^{\frac{-Px}{0.1}} <$$
$$PTB < 7.9 + 77.1e^{\frac{-Px}{2.7}} + 4.5e^{\frac{-Px}{34.3}} + 0.5e^{\frac{-Px}{0.1}},$$
$$PTB = 3.9 + 77.1e^{\frac{-Px}{2.7}} + 4.5e^{\frac{-Px}{34.3}} + 0.5e^{\frac{-Px}{0.1}}, \text{ or}$$
$$PTB = 7.9 + 77.1e^{\frac{-Px}{2.7}} + 4.5e^{\frac{-Px}{34.3}} + 0.5e^{\frac{-Px}{0.1}}.$$

8. The method as recited in claim 6, wherein a second electrode portion of the plurality of electrode portions is adjacent to the second light-blocking portion, the brightness distribution correspondingly between the second electrode portion and the second light-blocking portion has a second maximum brightness corresponding to a second location on the second substrate, a maximum width from the second location to the first location along the first direction is denoted by m, and a width of the first light-blocking portion along the first direction is denoted by B, and PTB is equal to (Px+B−m)/2, and the units of B and m are μm.

9. The method as recited in claim 6, wherein the first electrode layer further includes a first connection portion, the first connection portion is disposed on two opposite sides of the electrode portions and electrically connected to the electrode portions.

10. The method as recited in claim 6, wherein the first electrode layer further includes a second connection portion, the second connection portion is disposed around the electrode portions and electrically connected with the electrode portions.

* * * * *